United States Patent
Lee et al.

(10) Patent No.: US 8,630,082 B2
(45) Date of Patent: Jan. 14, 2014

(54) MULTILAYER CERAMIC ELECTRONIC COMPONENT AND METHOD OF MANUFACTURING THE SAME

(75) Inventors: Jong Ho Lee, Gyunggi-do (KR); Sung Chul Bae, Gyunggi-do (KR); Jae Yeol Choi, Gyunggi-do (KR); Sung Woo Kim, Gyunggi-do (KR); Yu Na Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 25 days.

(21) Appl. No.: 13/491,192

(22) Filed: Jun. 7, 2012

(65) Prior Publication Data
US 2013/0242460 A1      Sep. 19, 2013

(30) Foreign Application Priority Data
Mar. 19, 2012   (KR) ................. 10-2012-0027775

(51) Int. Cl.
*H01G 4/005*   (2006.01)
(52) U.S. Cl.
USPC ..... 361/303; 361/305; 361/306.1; 361/306.3; 361/321.1; 361/321.2
(58) Field of Classification Search
USPC ............ 361/303, 321.1, 321.2, 306.1, 306.3, 361/305, 311–313
See application file for complete search history.

(56) References Cited

U.S. PATENT DOCUMENTS

| | | | | |
|---|---|---|---|---|
| 6,278,602 B1 * | 8/2001 | Haratani et al. | ............... | 361/303 |
| 6,473,292 B1 * | 10/2002 | Yoshida et al. | ............ | 361/321.2 |
| 6,903,919 B2 * | 6/2005 | Kayatani et al. | ........... | 361/321.2 |
| 6,954,350 B2 * | 10/2005 | Honda et al. | ................ | 361/321.4 |
| 7,075,775 B2 * | 7/2006 | Yamazaki | .................. | 361/306.3 |
| 7,859,823 B2 * | 12/2010 | Suzuki | ........................ | 361/321.1 |

FOREIGN PATENT DOCUMENTS

JP      2001-353837      12/2001
JP      2005-056880       3/2005

* cited by examiner

*Primary Examiner* — Nguyen T Ha
(74) *Attorney, Agent, or Firm* — McDermott Will & Emery LLP

(57) ABSTRACT

There are provided a multilayer ceramic electronic component and a method of manufacturing the same, the multilayer ceramic electronic including: a ceramic body; and a plurality of internal electrodes laminated within the ceramic body, wherein, when T1 is the greatest distance between an upper outermost internal electrode and a lower outermost internal electrode among the plurality of internal electrodes and T2 is the distance between the highest point and the lowest point in each of the upper outermost internal electrode and the lower outermost internal electrode in a thickness direction of the ceramic body, T2/T1<0.05 is satisfied, and thus, defects in alignment of internal electrodes of the multilayer ceramic electronic component may be suppressed.

11 Claims, 2 Drawing Sheets

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0027775 filed on Mar. 19, 2012, in the Korean Intellectual Property Office, the disclosure of which is incorporated herein by reference.

BACKGROUND OF THE INVENTION

1. Field of the Invention

The present invention relates to a multilayer ceramic electronic component having excellent reliability by preventing defects in alignment of internal electrodes thereof, and a method of manufacturing the same.

2. Description of the Related Art

In accordance with the recent trend for the miniaturization of electronic products, demand for multilayer ceramic electronic components having a smaller size and larger capacitance has increased.

For this reason, dielectric layers and inner electrode layers have been thinned and multilayered through various methods. Recently, as the thickness of dielectric layers has been reduced, multilayer ceramic electronic components having an increased number of laminated layers have been manufactured.

Meanwhile, multilayer ceramic electronic components, particularly a multilayer ceramic capacitor, have been manufactured by printing internal electrodes having a predetermined thickness on ceramic sheets or substrate sheets, the internal electrodes having a smaller area than the ceramic sheets or the substrate sheets, and then laminating them. Here, as the printed width of the internal electrode is smaller, the printed internal electrode approaches a dome shape.

In the case in which the internal electrode has a dome-like shape, the dome shape does not bear pressure, to thereby be transformed in the process of laminating ceramic green sheets on which the internal electrodes are respectively printed and pressing them, which causes defects in the alignment of the internal electrodes.

As the multilayer ceramic capacitor has a small size and large capacitance, the printed width of the internal electrode inevitably becomes narrower and narrower, causing defects in the alignment of the internal electrodes to worsen.

The following related art document discloses that dummy electrodes are formed at the outer periphery of the sheet in the process of laminating the ceramic green sheets having the internal electrodes printed thereon and pressing them, in order to solve the above defects, but this cannot represent a fundamental solution to the above defects in small-sized electronic components having a smaller printed width.

Therefore, in the small-sized, large-capacitance multilayer ceramic electronic component having a small printed width, the defects in the alignment of the internal electrodes still needs to be solved.

RELATED ART DOCUMENT

Japanese Laid-Open Publication No. 2005-056880

SUMMARY OF THE INVENTION

An aspect of the present invention provides a multilayer ceramic electronic component having excellent reliability by preventing defects in alignment of internal electrodes thereof, and a method of manufacturing the same.

According to an aspect of the present invention, there is provided a multilayer ceramic electronic component, including: a ceramic body; and a plurality of internal electrodes laminated within the ceramic body, wherein, when T1 is the greatest distance between an upper outermost internal electrode and a lower outermost internal electrode among the plurality of internal electrodes and T2 is the distance between the highest point and the lowest point in each of the upper outermost internal electrode and the lower outermost internal electrode in a thickness direction of the ceramic body, $T2/T1<0.05$ is satisfied.

The internal electrode may have a printed width of 300 μm or less.

The multilayer ceramic electronic component may have a length of $0.6\pm0.09$ mm or less and a width of $0.3\pm0.09$ mm or less.

The number of the laminated internal electrodes may be 50 layers or more.

The internal electrodes may include at least one metal selected from the group consisting of palladium (Pd), a palladium-silver (Pd—Ag) alloy, nickel (Ni), and copper (Cu).

According to another aspect of the present invention, there is provided a method of manufacturing a multilayer ceramic electronic component, the method including: preparing ceramic green sheets by using a slurry containing a ceramic powder; forming internal electrode patterns on the respective ceramic green sheets by using a conductive paste containing a metal powder; and laminating the resultant ceramic green sheets, followed by sintering, to thereby form a ceramic body including a plurality of internal electrodes, wherein, when T1 is the greatest distance between an upper outermost internal electrode and a lower outermost internal electrode among the plurality of internal electrodes and T2 is the distance between the highest point and the lowest point in each of the upper outermost internal electrode and the lower outermost internal electrode in a thickness direction of the ceramic body, $T2/T1<0.05$ is satisfied.

The internal electrode may have a printed width of 300 μm or less.

The multilayer ceramic electronic component may have a length of $0.6\pm0.09$ mm or less and a width of $0.3\pm0.09$ mm or less.

The number of the laminated internal electrodes may be 50 layers or more.

The metal powder may include at least one selected from the group consisting of palladium (Pd), a palladium-silver (Pd—Ag) alloy, nickel (Ni), and copper (Cu).

In the forming of the internal electrode patterns, a discharge amount of the conductive paste may be controlled.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
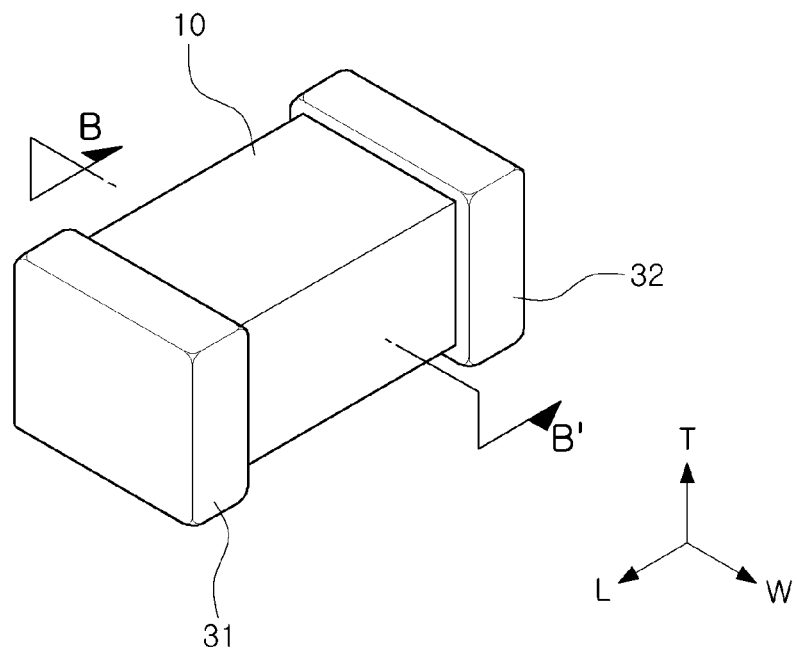
FIG. 1 is a perspective view schematically showing a multilayer ceramic capacitor according to an embodiment of the present invention.

The embodiments of the present invention may be modified in many different forms and the scope of the invention should not be seen as being limited to the embodiments set forth herein. The embodiments of the present invention are provided so that those skilled in the art may more completely understand the present invention. In the drawings, the shapes and dimensions may be exaggerated for clarity, and the same reference numerals will be used throughout to designate the same or like components.

Embodiments of the present invention will now be described in detail with reference to the accompanying drawings.

FIG. 1 is a perspective view schematically showing a multilayer ceramic capacitor according to an embodiment of the present invention.

Figure 2:
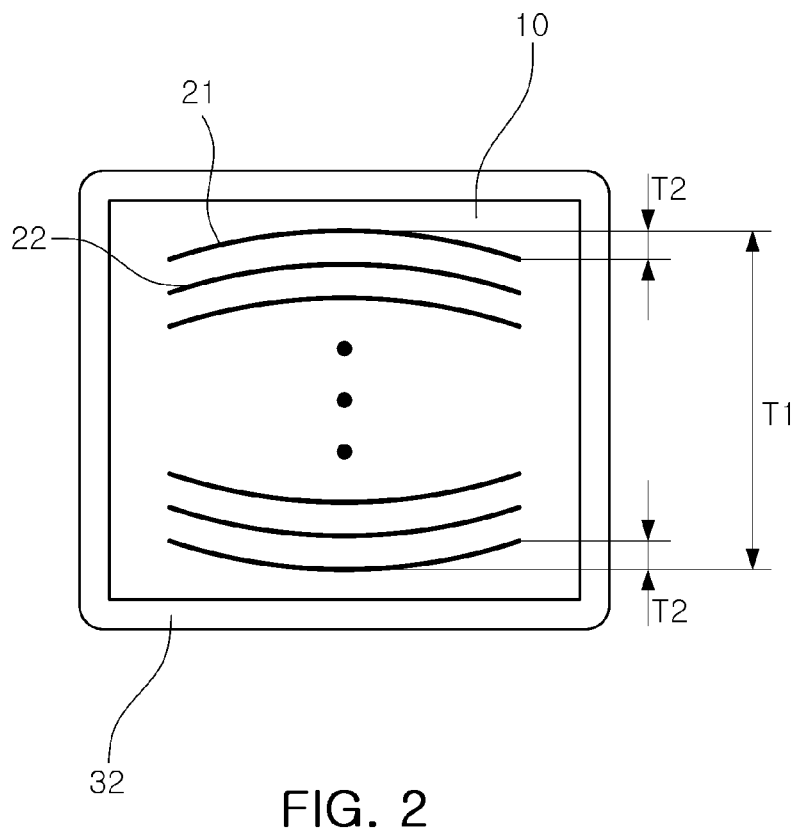
FIG. 2 is a cross-sectional view taken along line B-B' of FIG. 1.

FIG. 2 is a cross-sectional view taken along line B-B' of FIG. 1.

Referring to FIGS. 1 and 2, a multilayer ceramic electronic component according to the present embodiment of the invention may include: a ceramic body 10; and a plurality of internal electrodes 21 and 22 laminated therewithin. Here, when T1 is a greatest distance between an upper outermost internal electrode and a lower outermost internal electrode among the plurality of internal electrodes 21 and 22 and T2 is the distance between the highest point and the lowest point in the upper outermost internal electrode and the lower outermost internal electrode in a thickness direction of the ceramic body 10, T2/T1<0.05 may be satisfied.

Hereinafter, the multilayer ceramic electronic component according to the present embodiment of the invention, particularly, a multilayer ceramic capacitor, will be described, but the present invention is not limited thereto.

The ceramic body 10 may have, but is not limited to, for example, a hexahedral shape.

Meanwhile, in the multilayer ceramic capacitor according to the present embodiment of the invention, a 'length direction', a 'width direction', and a 'thickness direction' are defined by an 'L' direction, a 'W' direction, and a 'T' direction in FIG. 1, respectively. Here, the 'thickness direction' may be used in the same manner as a direction in which the dielectric layers are laminated, that is, a 'lamination direction'.

The multilayer ceramic capacitor according to the present embodiment of the invention may include the ceramic body 10; and the plurality of internal electrodes 21 and 22 laminated therewithin.

The plurality of internal electrodes 21 and 22 may be formed by using a conductive paste containing, but not limited to, for example, at least one of a precious metal, such as palladium (Pd), a palladium-silver (Pd—Ag) alloy, and the like, nickel (Ni), and copper (Cu).

First and second external electrodes 31 and 32 may be formed on an outside of the ceramic body 10 in order to implement capacitance, and may be electrically connected to the first and second internal electrodes 21 and 22.

The first and second external electrodes 31 and 32 may be formed of the same conductive material as the internal electrodes, but are not limited thereto. For example, the first and second external electrodes 31 and 32 may be formed of copper (Cu), silver (Ag), nickel (Ni), or the like.

The first and second external electrodes 31 and 32 may be formed by coating a conductive paste, prepared by adding glass frit to the metal powder, on the outside of the ceramic body 10, and sintering it.

According to an embodiment of the present invention, when T1 is the greatest distance between an upper outermost internal electrode and a lower outermost internal electrode 21 and 22 among the plurality of internal electrodes and T2 is the distance between the highest point and the lowest point in the upper outermost internal electrode and the lower outermost internal electrode in a thickness direction of the ceramic body, T2/T1<0.05 may be satisfied.

Generally, the multilayer ceramic capacitor is manufactured by respectively printing internal electrodes having a predetermined thickness on ceramic sheets or substrate sheets, the internal electrode having a smaller area than the ceramic sheet or the substrate sheet, and then laminating them.

Here, as the printed width of the internal electrode is smaller, the printed internal electrode approaches a dome shape.

As above, in the case in which the internal electrode has a dome shape, the dome shape does not bear pressure, to thereby be transformed in the process of laminating ceramic green sheets on which the internal electrodes are respectively printed and pressing them, which may cause defects in internal electrode alignment.

The defects in alignment may mean that, in the manufacturing process of the multilayer ceramic capacitor, the printed internal electrode approaches a dome shape as the printed width of the internal electrode is smaller, and respective layers may not be aligned, and thereby transformed in the process of laminating ceramic green sheets on which the internal electrodes are respectively printed and pressing them, and thus, the respective layers of the ceramic green sheets are obliquely formed.

Particularly, as the multilayer ceramic capacitor has a smaller size and larger capacitance, the printed width of the internal electrode inevitably becomes narrower and narrower, causing internal electrode alignment defects to worsen.

According to an embodiment of the present invention, when T1 is the greatest distance between the upper outermost internal electrode and the lower outermost internal electrode among the plurality of internal electrodes 21 and 22 and T2 is the distance between the highest point and the lowest point in the upper outermost internal electrode and the lower outermost internal electrode in a thickness direction of the ceramic body 10, T1 and T2 are controlled such that T2/T1<0.05 is satisfied, and thus, the above defects may be solved.

Specifically, when T1 and T2 are controlled such that T2/T1<0.05 is satisfied, the deviation in an upper portion and a lower portion of the dome shape, the printed shape of the internal electrode, may be reduced, so that the defects in alignment due to transformation of the internal electrode in the process of laminating the ceramic green sheets on which the internal electrodes are respectively printed and pressing them.

Referring to FIG. 2, the greatest distance T1 between the upper outermost internal electrode and the lower outermost internal electrode among the plurality of internal electrodes 21 and 22, may be defined by the greatest distance in a thickness direction between the upper and lower outermost internal electrodes among the plurality of internal electrodes 21 and 22.

The plurality of internal electrodes 21 and 22 are present such that they are each bent in a thickness direction of the ceramic body 10, and in this case, there may be the greatest distance and the shortest distance in the thickness direction of the ceramic body 10 between the upper and lower outermost internal electrodes among the plurality of internal electrodes 21 and 22.

According to an embodiment of the present invention, T1 may be defined by the greatest distance in the thickness direction between the upper and lower outermost internal electrodes among the plurality of internal electrodes 21 and 22 laminated within the ceramic body 10.

Meanwhile, since the plurality of internal electrodes 21 and 22 are present such that they are each bent in a thickness direction of the ceramic body 10, the upper and lower outermost internal electrodes each may have the highest point and the lowest point in the thickness direction of the ceramic body 10.

According to an embodiment of the present invention, in the upper or lower outermost internal electrode, the distance between the highest point and the lowest point in the thickness direction of the ceramic body 10 may be defined by T2.

That is, by controlling T1 and T2 such that T2/T1<0.05 is satisfied, the deviation between the upper portion and the lower portion of the internal electrode may be reduced, thereby preventing the defects in alignment, and thus achieving the improvement of reliability.

The method of controlling T1 and T2 such that T2/T1<0.05 is satisfied will be described in detail through a method of manufacturing a multilayer ceramic capacitor according to another embodiment of the present invention described later, and may be realized by controlling a discharge amount of a conductive paste when internal electrode patterns are formed on the ceramic green sheets in the process of manufacturing the multilayer ceramic capacitor.

Specifically, the method of forming the internal electrode patterns on the ceramic green sheets is not particularly limited, but for example, a screen printing method, a gravure printing method, or the like may be employed.

Particularly, according to the screen printing method, the internal electrode patterns may be respectively formed on the ceramic green sheets by supplying a conductive paste for an internal electrode to a screen print plate so that the conductive paste is discharged through a mesh of the screen print plate.

In this case, the internal electrode pattern formed on the ceramic green sheet may be prevented from having the dome shape, by controlling the discharge amount of the conductive paste for an internal electrode.

Due to this, the multilayer ceramic capacitor according to the present embodiment of the invention may satisfy T2/T1<0.05 and reduce defects in interlayer alignment, thereby achieving an improvement in reliability.

When the T2/T1 value is 0.05 or greater, the distance (T2) between the highest point and the lowest point in the thickness direction of the ceramic body 10 in the upper or lower outermost internal electrode becomes greater than the greatest distance (T1) between the upper and lower outermost internal electrodes among the plurality of internal electrodes 21 and 22, which may bring about deterioration in reliability.

That is, the greater T2 value indicates that the upper or lower outermost internal electrode is further bent in the thickness direction thereof, which may cause defective alignment.

In addition, when the T2 value becomes large as above, an upper surface and a lower surface of the ceramic body 10 each have a curved surface in view of the entire shape of the ceramic body 10, and pick-up defects may occur during a subsequent process of mounting the substrate in the multilayer ceramic capacitor.

The printed widths of the plurality of internal electrodes 21 and 22 each may be, without being particularly limited to, for example, 300 μm or less.

As the printed width of the internal electrode becomes smaller, the printed shape of the internal electrode approaches a dome shape, which may cause defective alignment in the process of manufacturing the multilayer ceramic capacitor.

That is, when the printed widths of the plurality of internal electrodes 21 and 22 each is 300 μm or less, defective alignment may occur. Meanwhile, the occurrence of defective alignment may be reduced by controlling T1 and T2 such that T2/T1<0.05 is satisfied.

When the printed widths of the plurality of internal electrodes 21 and 22 each is above 300 μm, the defective alignment may not be particularly problematic since the printed width is sufficiently large.

The number of internal electrodes 21 and 22 laminated within the ceramic body 10 may be 50 layers or more, but is not limited thereto.

According to an embodiment of the present invention, the defective alignment in the multilayer ceramic capacitor may be particularly problematic when the multilayer ceramic capacitor has a smaller size and larger capacitance, and the increased number of laminated layers may cause the defective alignment to be worse.

Therefore, the defective alignment which may occur when the number of the internal electrodes 21 and 22 laminated within the ceramic body 10 is 50 layers or more may be improved by controlling T1 and T2 such that T2/T1<0.05 is satisfied.

The internal electrodes may have an average thickness of, without being particularly limited to, for example, 0.6 μm or less.

In addition, the multilayer ceramic electronic component may have a length of 0.6±0.09 mm or less and a width of 0.3±0.09 mm or less.

The average thickness of the internal electrodes 21 and 22 may be measured from an image obtained by scanning a cross section in a width direction of the ceramic body 10 using a scanning electron microscope (SEM), as shown in FIG. 2.

For example, as shown in FIG. 2, the average thickness of the internal electrode may be obtained by measuring the thicknesses of 30 regions that are equidistant in a width direction, on an image of any internal electrode extracted from the image obtained by scanning a cross section in a width-thickness (W-T) direction, cut in a central portion in a length (L) direction of the ceramic body 10, and then calculating an average value of the thicknesses.

In addition, when this measurement for obtaining the average thickness value is extensively performed on ten or more internal electrodes and then an average measurement value is calculated, the average thickness of the internal electrode may be more generalized.

As the multilayer ceramic capacitor has a smaller size and larger capacitance, the average thickness of the internal electrode may also be reduced, and thus, the number of laminations tends to increase.

That is, in the case of a microminiaturized multilayer ceramic capacitor in which the average thickness of the internal electrode is 0.6 μm or less, the printed width also gets smaller, and thus the printed shape of the internal electrode approaches a dome shape, which may cause defective interlayer alignment.

According to an embodiment of the present invention, even in a case in which the average thickness of the internal electrode is 0.6 μm or less as above, the reliability of the multilayer ceramic capacitor may be improved by controlling T1 and T2 such that T2/T1<0.05 is satisfied.

Figure 3:
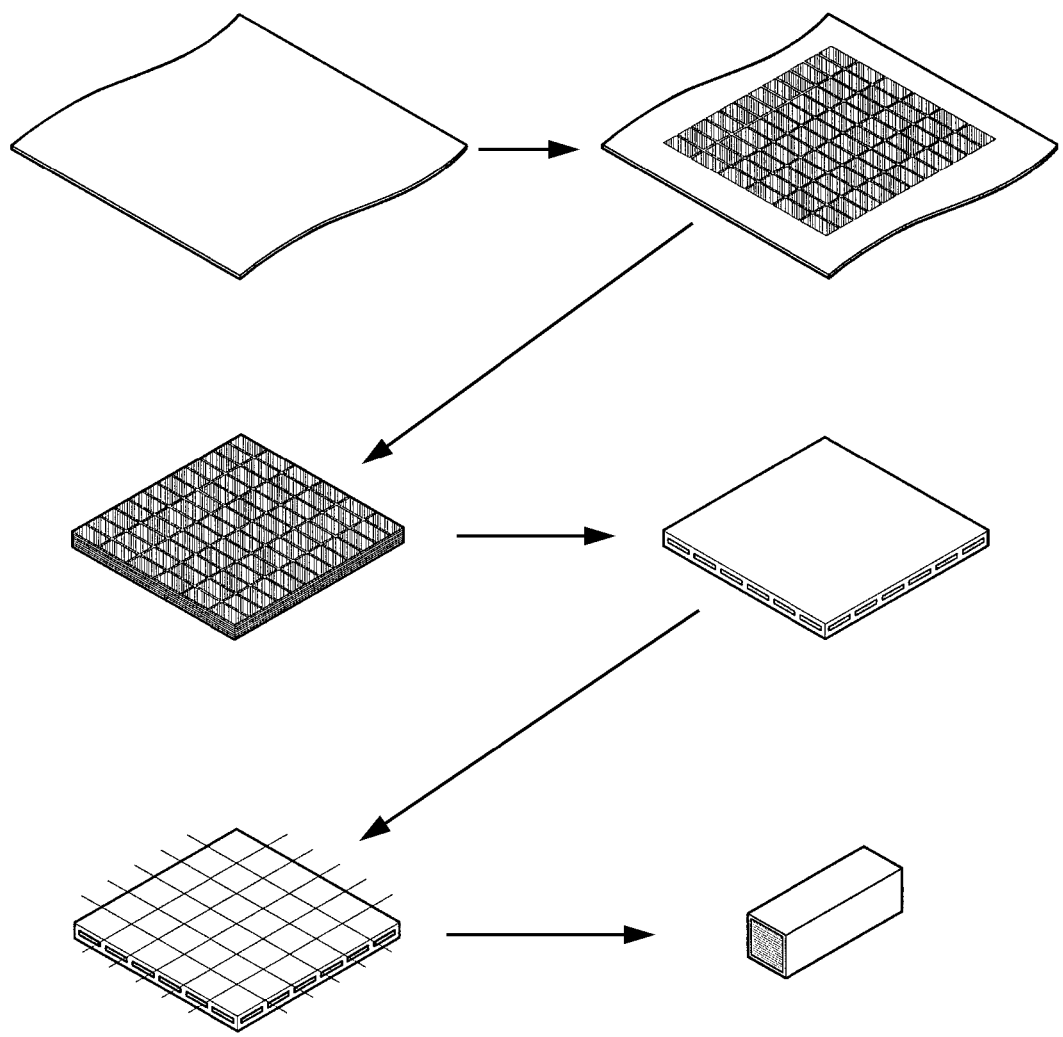
FIG. 3 is a view showing a process of manufacturing a multilayer ceramic capacitor according to another embodiment of the present invention.

FIG. 3 is a view showing a process of manufacturing a multilayer ceramic capacitor according to another embodiment of the present invention.

Referring to FIG. 3, a method of manufacturing a multilayer ceramic electronic component according to the present embodiment of the invention may include: preparing ceramic green sheets by using a slurry containing a ceramic powder; forming internal electrode patterns on respective ceramic green sheets by using a conductive paste containing a metal powder; and laminating the resultant ceramic green sheets and sintering them, to thereby form a ceramic body including a plurality of internal electrodes. Here, when T1 is the greatest distance between an upper outermost internal electrode and a lower outermost internal electrode among the plurality of internal electrodes and T2 is the distance between the highest point and the lowest point in the upper outermost internal electrode and the lower outermost internal electrode in a thickness direction of the ceramic body, $T2/T1<0.05$ may be satisfied.

The method of manufacturing the multilayer ceramic electronic component will be described below, except for the features of the multilayer ceramic electronic component according to the above-described embodiment of the invention, and particularly, a multilayer ceramic capacitor will be described.

According to the method of manufacturing the multilayer ceramic capacitor according to the present embodiment of the invention, firstly, ceramic green sheets may be prepared by using a slurry containing a ceramic powder.

The ceramic powder may be, without being particularly limited to, for example, a barium titanate ($BaTiO_3$) powder.

Then, internal electrode patterns may be formed on respective ceramic green sheets by using a conductive paste containing a metal powder.

The metal powder may include at least one selected from the group consisting of palladium (Pd), a palladium-silver (Pd—Ag) alloy, nickel (Ni), and copper (Cu).

The printed width of the internal electrode may be 300 μm or less, and the average thickness of the internal electrode may be 0.6 μm or less.

The forming of the internal electrode patterns may be performed by controlling the discharge amount of the conductive paste.

That is, by controlling the discharge amount of the conductive paste, $T2/T1<0.05$ may be satisfied when T1 is the greatest distance between an upper outermost internal electrode and a lower outermost internal electrode among the plurality of internal electrodes and T2 is the distance between the highest point and the lowest point in the upper outermost internal electrode and the lower outermost internal electrode in a thickness direction of the ceramic body.

Therefore, in the multilayer ceramic capacitor, the defective interlayer alignment may be improved, thereby obtaining excellent reliability.

The ceramic green sheets are laminated, and then sintered, to thereby form a ceramic body including a plurality of internal electrodes. In this case, the number of internal electrodes laminated may be 50 layers or more.

Hereafter, the present invention will be described in detail with reference to embodiments, but is not limited thereto.

A multilayer ceramic capacitor according to the present embodiment of the invention was manufactured as follows.

First, a slurry prepared by including a powder of barium titanate ($BaTiO_3$) or the like, having an average particle size of 0.1 μm, was coated on a carrier film, followed by drying, thereby preparing a plurality of ceramic green sheets having a thickness of 1.05 μm or 0.95 μm. With this, dielectric layers were formed.

Then, a conductive paste for internal electrodes containing a nickel powder having an average particle size of 0.1 to 0.12 μm was prepared.

A barium titanate ($BaTiO_3$) powder was further added to the conductive paste for internal electrodes, separately to the nickel powder.

The conductive paste for inner electrodes was coated on the green sheets through a screen printing method while the discharge amount of the conductive paste was controlled, to thereby form inner electrodes, and then the resultant sheets were laminated in 400 to 500 layers to thereby form a laminate.

Thereafter, compressing and cutting are performed on the laminate, to thereby produce 0603 standard-sized chips, and each of the chips was sintered at a temperature of 1050 to 1200° C. under a reducing atmosphere of $H_2$ of 0.1% or less.

Then, an external electrode forming process, a plating process, and the like were performed to manufacture a multilayer ceramic capacitor.

As set forth above, according to embodiments of the invention, a multilayer ceramic electronic component having excellent reliability may be realized by suppressing defects in the internal electrode alignment thereof.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic body; and
    a plurality of internal electrodes laminated within the ceramic body,
    when T1 is the greatest distance between an upper outermost internal electrode and a lower outermost internal electrode among the plurality of internal electrodes and T2 is the distance between the highest point and the lowest point in each of the upper outermost internal electrode and the lower outermost internal electrode in a thickness direction of the ceramic body, $T2/T1<0.05$ being satisfied.

2. The multilayer ceramic electronic component of claim 1, wherein the internal electrode has a printed width of 300 μm or less.

3. The multilayer ceramic electronic component of claim 1, wherein it has a length of 0.6±0.09 mm or less and a width of 0.3±0.09 mm or less.

4. The multilayer ceramic electronic component of claim 1, wherein the number of the laminated internal electrodes is 50 layers or more.

5. The multilayer ceramic electronic component of claim 1, wherein the internal electrode includes at least one metal selected from the group consisting of palladium (Pd), a palladium-silver (Pd—Ag) alloy, nickel (Ni), and copper (Cu).

6. A method of manufacturing a multilayer ceramic electronic component, the method comprising:
    preparing ceramic green sheets by using a slurry containing a ceramic powder;
    forming internal electrode patterns on the respective ceramic green sheets by using a conductive paste containing a metal powder; and
    laminating the resultant ceramic green sheets, followed by sintering, to thereby form a ceramic body including a plurality of internal electrodes,
    when T1 is the greatest distance between an upper outermost internal electrode and a lower outermost internal electrode among the plurality of internal electrodes and T2 is the distance between the highest point and the lowest point in each of the upper outermost internal electrode and the lower outermost internal electrode in a thickness direction of the ceramic body, T2/T1<0.05 being satisfied.

7. The method of claim 6, wherein the internal electrode has a printed width of 300 μm or less.

8. The method of claim 6, wherein the multilayer ceramic electronic component has a length of 0.6±0.09 mm or less and a width of 0.3±0.09 mm or less.

9. The method of claim 6, wherein the number of the laminated internal electrodes is 50 layers or more.

10. The method of claim 6, wherein the metal powder includes at least one selected from the group consisting of palladium (Pd), a palladium-silver (Pd—Ag) alloy, nickel (Ni), and copper (Cu).

11. The method of claim 6, wherein in the forming of the internal electrode patterns, a discharge amount of the conductive paste is controlled.

\* \* \* \* \*